United States Patent [19]

Wengrovius et al.

[11] Patent Number: 4,554,310
[45] Date of Patent: Nov. 19, 1985

[54] ROOM TEMPERATURE VULCANIZABLE ORGANOPOLYSILOXANE COMPOSITIONS AND METHOD FOR MAKING

[75] Inventors: Jeffrey H. Wengrovius, Scotia; Leonard W. Niedrach, Schenectady, both of N.Y.

[73] Assignee: General Electric Company, Schenectady, N.Y.

[21] Appl. No.: 644,892

[22] Filed: Aug. 27, 1984

[51] Int. Cl.$^4$ .............................................. C08K 5/23
[52] U.S. Cl. ................................. 524/715; 252/390; 252/391; 524/719; 524/720; 528/18; 528/33; 528/34; 528/901
[58] Field of Search ............... 252/390, 391; 524/715, 524/719, 720; 528/18, 33, 34, 901

[56] References Cited

U.S. PATENT DOCUMENTS 4,461,854 7/1984 Smith .................................. 524/268
4,461,867 7/1984 Suprenant ............................ 524/35

FOREIGN PATENT DOCUMENTS 809731 3/1959 United Kingdom .

OTHER PUBLICATIONS

The Use of Benzotriazole as a Corrosion Inhibitor for Copper, Walker, Methods & Materials, 17, (9), 1971.
Corrosion Inhibitors for Copper, Desai, et al., Methods and Materials, 18, (2), 1971.
Improvements to Microcircuit Reliability b–The Use of Inhibited Encapsulants, Ainger, et al., American Chemical Society, (1984), pp. 314–322.

*Primary Examiner*—Melvyn I. Marquis
*Attorney, Agent, or Firm*—William A. Teoli; James C. Davis, Jr.; James Magee, Jr.

[57] ABSTRACT

Room temperature vulcanizable organopolysiloxane compositions are provided which exhibit improved stability and a reduced tendency to corrode copper upon contact resulting from the employment of an effective amount of a tin condensation catalyst having organo radicals attached to tin by carbon tin linkages and whose remaining valences are satisfied by a chelate radical or a dicarboxylate radical in combination with an organic triazole such as benzotriazole.

12 Claims, No Drawings

ROOM TEMPERATURE VULCANIZABLE ORGANOPOLYSILOXANE COMPOSITIONS AND METHOD FOR MAKING

CROSS REFERENCE TO RELATED APPLICATIONS

Reference is made to copending application of J. H. Wengrovius and T. P. Lockhart, Ser. No. 583,530 now U.S. Pat. No. 4,517,337, filed Feb. 24, 1984, for Room Temperature Vulcanizable Organopolysiloxane Compositions and Method for Making, copending application Ser. No. 644,893 of J. H. Wengrovius, and copending application Ser. No. 644,891 of J. H. Wengrovius and T. P. Lockhart for Room Temperature Vulcanizable Organopolysiloxane Compositions, filed concurrently herewith, where all of the aforementioned applications are assigned to the same assignee as the present invention and incorporated herein by reference.

BACKGROUND OF THE INVENTION

The present invention relates to room temperature vulcanizable organopolysiloxane compositions having improved shelf stability and a reduced tendency to corrode copper, resulting from the use of an effective amount of an inhibitor such as aryltriazole and a tin condensation catalyst having organo radicals attached to tin by carbon-tin linkages and whose remaining valences are satisfied by a $\beta$-diketonate group, for example, di(n-butyl)tinbis(acetylacetonate), or a dicarboxy radical such as diethylmalonate or dicarboxy hexahydrophthalate.

Prior to the present invention as shown by Brown et al, U.S. Pat. No. 3,161,614, attempts were made to make stable room temperature vulcanizable (RTV) compositions employing a polyalkoxy end blocked polysiloxane and a monocarboxylic acid metal salt catalyst, such as dibutyltindilaurate. These compositions did not cure satisfactorily. Improved results were obtained by Beers, U.S. Pat. No. 4,100,129, assigned to the same assignee as the present invention, utilizing as a condensation catalyst, a silanol reactive organometallic ester having organo radicals attached to metal through metal-oxygen-carbon linkages. Experience has shown that in instances where silanol reactive organo tin compounds are used as RTV condensation catalysts which have organo radicals attached to tin by tin-oxygen-carbon linkages, the resulting moisture curable compositions are often unstable.

As utilized hereinafter, the term "stable" as applied to the one package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Further advances were achieved with the employment of silane scavengers for eliminating chemically combined hydroxy radicals, water, or methanol, as shown by White et al, U.S. Pat. No. 4,395,526, assigned to the same assignee as the present invention and incorporated herein by reference. However, the preparation of these silane scavengers, such as methyldimethoxy-(N-methylacetamide)silane often requires special techniques and undesirable by-products can be generated during cure. Further improvements are shown by Dziark for scavengers for one component alkoxy functional RTV compositions and process, U.S. Pat. No. 4,417,042, assigned to the same assignee as the present invention and incorporated herein by reference.

In copending application Ser. No. 583,530, now U.S. Pat. No. 4,517,337 it was found that tin condensation catalyst having organo radicals attached to tin by carbon-tin linkages whose remaining valences satisfied by a $\beta$-diketonate group, for example, di(n-butyl)tinbis(acetylacetonate) could be used as a condensation catalyst in room temperature vulcanizable organopolysiloxane compositions as described above without the employment of a scavenger for trace amounts of water, methanol and silanol.

As shown in copending application Ser. No. 644,891, improvements have been achieved with respect to reducing the tendency of RTV compositions to corrode copper under vapor phase corrosion conditions, while still maintaining a stable RTV formulation, without the employment of a scavenger, by utilizing as the tin condensation catalyst, an effective amount of a tin compound having organo radicals attached to tin by carbon tin linkages and whose remaining valences are satisfied by a dicarboxylate radical, such as diethylmalonate or hexahydrophthalic dicarboxylate as defined more particularly below. As used hereinafter, the expression "vapor phase corrosion" means corrosion, as shown by a change in color, occurring on a brass strip (85% by weight of copper) which is suspended above a mixture of 15 parts by weight of uncured RTV and 5 parts of water in a closed container.

Even though RTV formulations can exhibit an ability to resist copper corrosion under vapor phase corrosion conditions, unacceptable corrosion also can occur when such RTV in the cured state is allowed to contact metallic copper at ambient conditions for an indefinite period of time.

The present invention is based on the discovery that significant improvements with respect to contact copper corrosion can be achieved with RTV organopolysiloxane formulations comprising the combination of an effective amount of a tin condensation catalyst having the formula $$(R)_2Sn[Y'], \qquad (1)$$

and a copper corrosion inhibitor as defined hereinafter, which is capable of retarding the corrosion of metallic copper, when in contact with the RTV in the cured state at ambient temperatures over an extended period of time, where R is selected from $C_{(1-18)}$ monovalent hydrocarbon radicals and substituted $C_{(1-18)}$ monovalent hydrocarbon radicals, and Y' is a divalent radical selected from (i) a chelate group having the formula

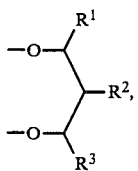

(ii) and a dicarboxylate group having the formula

$R^1$, $R^2$ and $R^3$ are the same or different monovalent radials selected from the class consisting of hydrogen, R, —Si(R)$_3$, acyl and nitrile, $R^4$ is selected from divalent $C_{(1-18)}$ hydrocarbon radical and substituted divalent $C_{(1-18)}$ hydrocarbon radicals.

STATEMENT OF THE INVENTION

There is provided by the present invention, room temperature vulcanizable organopolysiloxane compositions comprising by weight
   (A) 100 parts of organopolysiloxane consisting essentially of chemically combined diorganosiloxy units and terminated with polyalkoxysiloxy units,
   (B) 0 to 10 parts of a polyalkoxysilane,
   (C) 0 to 5 parts of amine accelerator,
   (D) an effective amount of a tin condensation catalyst of formula (1) and
   (E) 0.001 to 5 parts of a copper corrosion inhibitor selected from the class consisting of organic triazoles, imidazoles and mercaptoaryltriazoles.

There is also provided by the present inventions, a method for making room temperature vulcanizable organopolysiloxane compositions exhibiting improved stability and a reduced tendency to corrode copper upon contact at ambient temperatures over an extended period of time, which comprises, mixing together under substantially anhydrous conditions, the following ingredients by weight,
   (i) 100 parts of alkoxy terminated polydiorganosiloxane,
   (ii) 0 to 10 parts of polyalkoxysilane,
   (iii) 0 to 5 parts of amine accelerator,
   (iv) an effective amount of tin condensation catalyst of formula (1) and
   (v) 0.001 to 5 parts of a copper corrosion inhibitor selected from the class consisting of organic triazoles, imidazoles and mercaptoarylthiazoles.

In another aspect of the present invention, there is provided a method for making room temperature vuclanizable organopolysiloxane compositions having a reduced tendency to corrode copper upon contact when in the cured state, which has from 0.001 to 5 parts of a copper corrosion inhibitor selected from organotriazoles, imidazoles and mercaptoarylthiazoles based on the weight of 100 parts of silanol terminated polydiorganosiloxane used in such room temperature vulcanizable organopolysiloxane compositions which comprises
   (1) agitating under substantially anhydrous conditions
      (a) 100 parts of silanol terminated polydiorganosiloxane,
      (b) 0.1 to 10 parts of polyalkoxy silane,
      (c) 0 to to 5 parts of amine accelerator,
      (d) 0 to 700 parts of filler,
   (2) allowing the mixture of (1) to equilibrate to produce polyalkoxy terminated polydiorganosiloxane and
   (3) further agitating the mixture of (2) under substantially anhydrous conditions with an effective amount of a tin condensation catalyst of formula (1), where the copper corrosion inhibitor can be added in steps (1), (2) or (3).

Some of the silanol terminated polydiorganosiloxamines which can be used to make the stable, substantially acid-free, moisture curable organopolysiloxane compositions of the present invention have the formula,

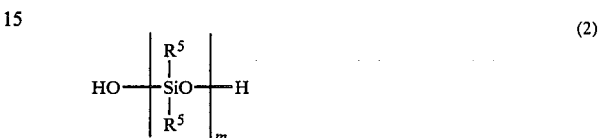

where $R^5$ is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, hydrogen and mixtures thereof, and m is an integer having a value of from about 5 to about 5000.

Polyalkoxy terminated organopolysiloxane which can be used to make the RTV compositions of the present invention has the formula,

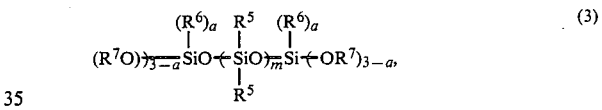

where $R^5$ and m are as previously defined, $R^6$ is a monovalent radical selected from $C_{(1-13)}$ hydrocarbon radials and substituted $C_{(1-13)}$ hydrocarbon radicals, $R^7$ is a $C_{(1-8)}$ aliphatic organic radical selected from alkyl radicals, alkylether radicals, alkyl ester radicals, alkylketone radicals and alkylcyano or a $C_{(7-13)}$ aralkyl radical and a is a whole number equal to 0 or 1.

The RTV compositions of the present invention can contain a cross-linking polyalkoxysilane having the formula,

where $R^6$, $R^7$ and a are as previously defined.

There are included within $R^4$ radicals, methylene, dimethylene, trimethylene, tetramethylene, alkyl substituted dialkylene radical, such as dimethylmethylene, diethylmethylene, α-dimethylethylene, 2,2-dimethylpropylene; etc.; cycloaliphatic radicals, for example, cyclobutylene, cyclopentylene, cyclohexylene, cyclooctylene, etc.; $C_{(6-13)}$ arylene radicals for example, phenylene, tolylene, xylene, naphthylene, oxylene, chlorophenylene, etc., where the aforesaid $R^4$ radicals can be further substituted with monovalent radicals such as halogen, cyano, ester, amino, silyl and hydroxyl.

Radicals included within R of formula (1) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives thereof, for example, cyclohexyl, cyclobutyl; alkyl, alkenyl radicals and derivatives thereof, such as methyl, ethyl, propyl, chloropropyl, butyl, pentyl, hexyl, heptyl, octyl vinyl, allyl, and trifluoropropyl; $R^1$, $R^2$ and $R^3$ are the same or different monovalent radicals selected from hydrogen, R, $Si(R)_3$, acyl and nitrile, $R^5$ and $R^6$ are monovalent radicals selected from R radicals; radicals included within $R^7$ are, for example, $C_{(1-8)}$ alkyl radicals, for example, methyl, ethyl, propyl, butyl, pentyl; $C_{(7-13)}$ aralkyl radicals, for example, benzyl, phenylethyl, alkylether radicals such as 2-methoxyethyl, alkylester radicals, for example, 2-acetoxyethyl, alkylketone radicals, for example 1-butan-3-onyl, alkylcyano radicals, for example 2-cyanoethyl.

Some of the tin chelate condensation catalysts included within formula (1) are, for example, Di(n-butyl)tinbis(acetylacetonate); Di(n-butyl)tinbis(benzoylacetonate); Di(ethyl)tinbis(lauroylacetonate); Di(methyl)tinbis(pivaloylacetonate); Di(n-octyl)tinbis(acetylacetonate); and Di(n-propyl)tinbis(1,1,1-trifluoroacetylacetonate).

Some of the tin dicarboxylate catalysts of formula (1) are, for example,
di-N-butyltindiethylmalonate,
di-N-octyltinsuccinate,
di-N-octyltinoxalate,
di-N-butyltinhexahydrophthalate,
dimethyltinadipate,
di-N-butyltinglutamate,
di-N-propyltin(2-cyanoglutarate),
di-sec-butyltinadipate, and
di-N-pentyltinphthalate.

Included within the cross-linking polyalkoxysilanes of formula (4) are, for example, methyltrimethoxysilane; methyltriethoxysilane; ethyltrimethoxysilane; tetraethoxysilane; vinyltrimethoxysilane; etc.

Among the preferred copper corrosion inhibitors of the present invention there are included aryltriazoles such as benzotriazole and tolyltriazole. Additional triazoles are included within the following formula

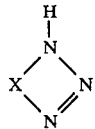
(5)

where X is a $C_1$-$C_{50}$ divalent organic radical, for example, a divalent $C_1$-$C_{50}$ hydrocarbon radical or substituted $C_1$-$C_{50}$ divalent hydrocarbon radical. In addition, there can be used imidazoles included within the formula,

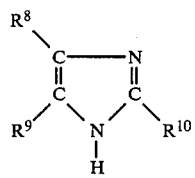

where $R^8$, $R^9$ and $R^{10}$ are monovalent radicals selected from hydrogen and R radicals as previously defined. Additional copper inhibitors which can be used are compounds such as 2-mercaptobenzothiazole and its derivatives.

Among the amine curing accelerators which can be used in the practice of the present invention are silyl substituted guanidines having the formula, $$(Z)_g Si(OR^7)_{4-g}, \quad (7)$$

where $R^7$ is as previously defined, Z is a guanidine radical of the formula,

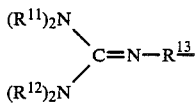

where $R^{13}$ is divalent $C_{(2-8)}$ alkylene radical, $R^{11}$ and $R^{12}$ are selected from hydrogen and $C_{(1-8)}$ alkyl radicals and g is an integer equal to 1 to 3 inclusive. In addition, alkyl substituted guanidines having the formula,

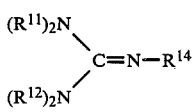

where $R^{11}$ and $R^{12}$ are as previously defined and $R^{14}$ is a $C_{(1-8)}$ alkyl radical, also can be employed. Some of the silyl substituted guanidines included within formula (8) are shown by Takago U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, γ-aminopropyltrimethoxysilane and methyldimethoxy-d-n-hexylaminosilane. Methyldimethoxy-di-n-hexylaminosilane acts as both a cross-linker and curing accelerator. The primary amines, secondary amines, silylated secondary amines are preferred and secondary amines, and silylated secondary amines are particularly preferred. Silylated secondary amine such as alkyldialkoxy-n-dialkylaminosilane and guanidines such as alkyldialkoxyalkylguanidylsilanes which are useful as cure accelerators.

In addition to the above-described amine accelerators, there is also included in the practice of the present invention the use of certain sterically hindered diamines which have been found to effect rapid cures of the RTV compositions of the present invention when utilized in effective amounts as previously defined. These nitrogen bases include, for example, di-t-butylethylene diamine (DBEDA), 1,5-diazabicyclo[4.3.0]non-5-ene (DBN), and 1,8-diazabicyclo[5.4.0]undec-7-ene (DBU).

It has been further found that RTV compositions of the present invention utilizing hindered secondary amines shown by the formula, $$HN-(R^{15})_2$$

where $R^{15}$ is selected from $C_{(3-18)}$ branched alkyl radicals, have an improved resistance to yellowing over an extended shelf period under sealed conditions.

In particular situations, chelating ligands can be used in the RTV compositions of the present inventions in amounts of up to 5 parts of ligand per 100 parts of alkoxy terminated polydiorganosiloxane. It is preferred to use such ligand, when using condensation catalyst having tin chelated with ligand such as, 2,4-pentanedione;
2,2,6,6-tetramethyl-3,5-heptanedione;
1,1,1-trifluoro-2,4-pentanedione;
1-phenyl-1,3-butanedione;
2,4-hexanedione;
5,7-nonanedione;

Silanol-terminated polydiorganosiloxanes of formula (2) are well known and preferably have a viscosity in the range of from about 100 to about 400,000 centipoise and more preferably from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (2) also are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.S. Pat. No. 835,790.

In order to facilitate the cure of the RTV compositions of the present invention, the tin condensation catalyst of formula (1) can be utilized at from 0.1 to 10 part of tin catalyst per 100 parts of the silanol terminated or alkoxy terminated polydiorganosiloxane and preferably from 0.1 to 1.0 part per 100 parts of the polydiorganosiloxane.

Various fillers, pigments, adhesion promoters, etc., can be incorporated in the silanol or alkoxy-terminated organopolysiloxane, such as for example, titanium dioxide, zirconium silicate, silica aerogel, iron oxide, diactomaceous earth, fumed silica, carbon black, precipitated silica, glass fibers, polyvinyl chloride, ground quartz, calcium carbonate, β-cyanoethyltrimethoxysilane, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example, stirring under moisture-free conditions, a mixture of materials which can consist of the tin condensation catalyst, the alkoxy terminated polydiorganosiloxane and corrosion inhibitor. Optionally, cross-linking polyalkoxysilane and amine accelerator can be used.

In instances where silanol terminated polydiorganosiloxane is used in place of the alkoxy terminated polydiorganosiloxane it is preferred that blending of the filler, for example, fumed silica, the silanol terminated polydiorganosiloxane and the cross-linking polyalkoxysilane be performed and in the absence of the tin condensation catalyst. The tin condensation catalyst can be introduced before or after the corrosion inhibitor and advantageously after the resulting blend has been agitated for a period of about 24 hours at room temperature.

As used hereinafter, the expression "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions a mixture of the silanol terminated polydiorganosiloxane or alkoxy terminated polydiorganosiloxane, filler and an effective amount of the tin condensation catalyst. There can be added to the mixture, the cross-linking silane or mixture thereof along with other ingredients, for example, the curing accelerator and pigments.

In order that those skilled in the art will be better able to practice the invention, the following examples is given by way of illustration and not by way of limitation. All parts are by weight.

EXAMPLE 1

An RTV base formulation was prepared by mixing together under substantially anhydrous conditions 100 parts by weight of a methyldimethoxysiloxy terminated polydimethylsiloxane having a viscosity of 40,000 centipoises at 25° C., 0.3 part of dibutylamine, 30 parts of a trimethoxysiloxy terminated polydimethylsiloxane having a viscosity of 100 centipoise at 25° C., 17 parts of fumed silica and 1.4 part of β-cyanoethyltrimethoxysilane.

RTV formulations were prepared by blending together under substantially anhydrous conditions 100 parts of the base polymer mixture, 0.35 part of dibutyltin(diethylmalonate) and 0.30 part of methyltrimethoxysilane (mixture 1). A mixture of 100 parts of the base polymer was also blended with 0.30 part of dibutyltindiethylmalonate, 0.13 part of benzotriazole and 0.30 part of methyltrimethoxysilane (mixture 2). A third mixture was prepared employing 100 parts of the base polymer, 0.37 part of dibutyltindiethylmalonate, 0.02 part of Reomet 39, a Ciba-Giegy benzotriazole derivative, and 0.66 part of methyltrimethoxysilane (mixture 3).

The above three formulations were blended under substantially anhydrous conditions and were mixed for 15 minutes in a Semco mixer. Five grams of each of the RTV formulations were applied to the surface of a 2"×2" section of clean copper metal. The RTV's were allowed to cure for 7 days while in contact with the copper metal surface. The samples were then heated to 120° F. in a 95% relative humidity environment for 28 days. A portion of the RTV sample was then removed from each of the copper substrates and the exposed substrate was visually examined for corrosion. It was found that the RTV made from mixture 1 left a blue film on the copper indicating that contact corrosion of the copper surface had occurred. There was no evidence of any change in the surface of the copper as shown by a clean metallic appearance of the RTV samples which were formed from mixture 2 and 3. This established that the RTV compositions made in accordance with the practice of the present invention were less corrosive to copper in accordance with Military Specification 46146A.

EXAMPLE 2

A room temperature vulcanizable composition was prepared by mixing together under substantially anhydrous conditions 100 parts of a methyldimethoxy end-capped polydimethylsiloxane having a viscosity of 120,000 centipoises, 20 parts of a polydimethylsiloxane having trimethylsiloxy terminal groups and a viscosity of 100 centipoises, 20 parts of fumed silica filler, 1 part of methyltrimethoxysilane, 0.2 part of dibutyltinacetylacetonate, 0.1 part of acetylacetone and 0.02 part of benzotriazole. The mixing of the RTV was performed under substantially anhydrous conditions. A copper corrosion test performed in accordance with the procedure of Example 1 showed that no contact copper corrosion occurred.

Although the above examples are directed to only a few of the very many variables which can be employed in the practice of the method of the present invention and in the RTV compositions made by such method, it should be understood that the present invention is directed to a much broader variety of RTV compositions and method for making as shown by the description preceding these examples.

What we claim as new and desire to secure by Letters Patent of the United States is:

1. Room temperature vulcanizable organopolysiloxane compositions comprising by weight,
    (A) 100 parts of organopolysiloxane consisting essentially of chemically combined diorganosiloxy units and terminated with polyalkoxysiloxy units,
    (B) up to 10 parts of a polyalkoxysilane,
    (C) up to 5 parts of amine accelerator selected from the class consisting of primary amines, secondary amines and silylated secondary amines,
    (D) an effective amount of a tin condensation catalyst of the formula, $(R)_2Sn[Y']$, and (E) 0.001 to 5 parts of a copper corrosion inhibitor selected from the class consisting of organic triazoles having the formula,

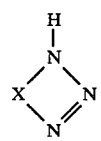

imidazoles having the formula,

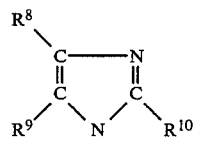

and mercaptoarylthiazoles,
    where R is selected from $C_{(1-18)}$ monovalent hydrocarbon radicals and substituted $C_{(1-18)}$ monovalent hydrocarbon radicals, and Y' is a divalent radical selected from
    (i) a chelate group having the formula

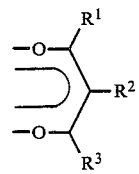

(ii) and a dicarboxylate group having the formula,

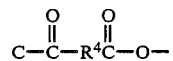

$R^1$, $R^2$ and $R^3$ are the same or different monovalent radials selected from the class consisting of hydrogen, R, $-Si(R)_3$, acyl and nitrile, $R^4$ is selected from divalent $C_{(1-18)}$ hydrocarbon radicals and substituted divalent $C_{(1-18)}$ hydrocarbon radicals, $R^8$, $R^9$ and $R^{10}$ are monovalent radicals selected from hydrogen and $C_{(1-18)}$ monovalent hydrocarbon radicals and substituted $C_{(1-18)}$ monovalent hydrocarbon radicals and X is a $C_1$-$C_{50}$ divalent organic radical.

2. An RTV composition in accordance with claim 1, where the tin condensation catalyst is a tindicarboxylate.

3. An RTV composition in accordance with claim 1, where the tin condensation catalyst is a tin chelate.

4. An RTV composition in accordance with claim 1, where the tin condensation catalyst is dibutyltindiethylmalonate.

5. An RTV composition in accordance with claim 1, where the organic triazole is benzotriazole.

6. An RTV composition in accordance with claim 1, where the copper inhibitor is imidazole.

7. A method for making room temperature vulcanizable organopolysiloxane compositions exhibiting improved stability and a reduced tendency to corrode copper upon contact which comprises, mixing together under substantially anhydrous conditions, the following ingredients by weight, (i) 100 parts of alkoxy terminated polydiorganosiloxane,
(ii) up to 10 parts of polyalkoxysilane,
(iii) up to 5 parts of amine accelerator selected from the class consisting of primary amines, secondary amines and silylated secondary amines,
(iv) an effective amount of tin condensation catalyst of the formula, (R)$_2$Sn[Y'], and (v) 0.001 to 5 parts of a copper corrosion inhibitor selected from the class consisting of organic triazoles, having the formula,

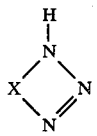

imidazoles having the formula,

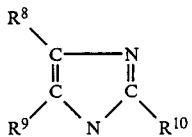

and mercaptoarylthiazoles,
where R is selected from C$_{(1-18)}$ monovalent hydrocarbon radicals and substituted C$_{(1-18)}$ monovalent hydrocarbon radicals, and Y' is a divalent radical selected from
(i) a chelate group having the formula

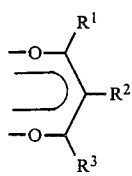

(ii) and a dicarboxylate group having the formula,

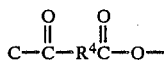

R$^1$, R$^2$ and R$^3$ are the same or different monovalent radicals selected from the class consisting of hydrogen, R, —Si(R)$_3$, acyl and nitrile, R$^4$ is selected from divalent C$_{(1-18)}$ hydrocarbon radicals and substituted divalent C$_{(1-18)}$ hydrocarbon radicals, R$^8$, R$^9$ and R$^{10}$ are monovalent radicals selected from hydrogen and C$_{(1-18)}$ monovalent hydrocarbon radicals and substituted C$_{(1-18)}$ monovalent hydrocarbon radicals and X is a C$_1$–C$_{50}$ divalent organic radical.

8. A method for making room temperature vuclanizable organopolysiloxane compositions having a reduced tendency to corrode copper upon contact when in the cured state, which has from 0.001 to 5 parts of a copper corrosion inhibitor selected from organotriazoles having the formula

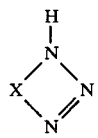

imidazoles having the formula,

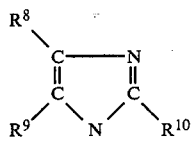

and mercaptoarylthiazoles based on the weight of 100 parts of silanol terminated polydiorganosiloxane used in such room temperature vulcanizable organopolysiloxane compositions which comprises
(1) agitating under substantially anhydrous conditions,
(a) 100 parts of silanol terminated polydiorganosiloxane,
(b) 0.1 to 10 parts of alkoxy silane,
(c) up to to 5 parts of amine accelerator selected from the class consisting of primary amines, secondary amines and silylated secondary amines,
(d) up to 700 parts of filler,
(2) allowing the alkoxysilane and silanol terminated polydiorganosiloxane in the mixture of (1) to intercondense to produce polyalkoxy terminated polydiorganosiloxane and
(3) further agitating the mixture of (2) under substantially anhydrous conditions with an effective amount of a tin condensation catalyst of the formula, (R)$_2$Sn[Y'], where the copper corrosion inhibitor can be added in steps (1), (2) or (3), R is selected from C$_{(1-18)}$ monovalent hydrocarbon radicals and substituted C$_{(1-18)}$ monovalent hydrocarbon radicals, and Y' is a divalent radical selected from
(i) a chelate group having the formula

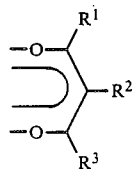

(ii) and a dicarboxylate group having the formula,

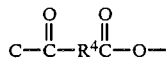

R$^1$, R$^2$ and R$^3$ are the same or different monovalent radials selected from the class consisting of hydrogen, R, —Si(R)$_3$, acyl and nitrile R$^4$ is selected from divalent C$_{(1-18)}$ hydrocarbon radicals and substituted divalent C$_{(1-18)}$ hydrocarbon radicals, R$^8$, R$^9$ and R$^{10}$ are monovalent radicals selected from hydrogen and C$_{(1-18)}$ monovalent hydrocarbon radicals and substituted $C_{(1-18)}$ monovalent hydrocarbon radicals and X is a $C_1$-$C_{50}$ divalent organic radical.

9. A method in accordance with claim 7 where the tin condensation catalyst is a tin dicarboxylate.

10. A method in accordance with claim 7, where the tin condensation catalyst is a tin chelate.

11. A method in accordance with claim 7, where the tin condensation catalyst is dibutyltindiethylmalonate.

12. A method in accordance with claim 7, where the organic triazole is benzotriazole.

* * * * *